United States Patent [19]

Moss

[11] Patent Number: 4,892,369

[45] Date of Patent: Jan. 9, 1990

[54] HOLOGRAPHIC REAR WINDOW STOPLIGHT

[75] Inventor: Gaylord E. Moss, Marina del Rey, Calif.

[73] Assignee: Hughes Aircraft Company, Los Angeles, Calif.

[21] Appl. No.: 793

[22] Filed: Jan. 6, 1987

[51] Int. Cl.$^4$ .................. G02B 5/32; G03H 1/28; F21Q 1/00; B60Q 1/44

[52] U.S. Cl. ...................... 350/3.7; 116/202; 340/468; 340/479; 350/3.75; 350/174

[58] Field of Search .............. 350/3.6, 3.7, 3.72, 350/174, 3.75, 3.77, 3.78; 340/84, 97, 107, 468, 479; 116/202

[56] References Cited

U.S. PATENT DOCUMENTS

| | | | |
|---|---|---|---|
| 3,317,906 | 5/1967 | Baldridge | 340/97 X |
| 3,665,392 | 5/1972 | Annas | 340/97 X |
| 3,848,974 | 11/1974 | Hosking et al. | 350/174 |
| 3,885,095 | 5/1975 | Wolfson et al. | 350/174 X |
| 3,887,273 | 6/1975 | Griffiths | 350/174 X |
| 3,940,204 | 2/1976 | Withrington | 350/174 X |
| 4,447,128 | 5/1984 | Ferrer | 350/174 |
| 4,487,472 | 12/1984 | Asano | 350/6.2 X |
| 4,574,269 | 3/1986 | Miller | 340/97 |
| 4,643,515 | 2/1987 | Upatnieks | 350/3.83 X |

FOREIGN PATENT DOCUMENTS 3416724 11/1985 Fed. Rep. of Germany ........ 340/97
2576566 8/1986 France .

OTHER PUBLICATIONS

Patent Abstracts of Japan, vol. 10, No. 51, (M-457), (2108), Feb. 28, 1986, and Japanese Patent No. 60199746, (Nissan Jisosha K.K.), Oct. 9, 1985.
Patent Abstracts of Japan, vol. 10, No. 88, (M-467), (2145), Apr. 5, 1986, and Japanese Patent No. 60226336, (Nissan Jisosha K.K.), Nov. 11, 1985.
Patent Abstracts of Japan, vol. 10, No. 122, (M-476), (2179), May 7, 1986, and Japanese Patent No. 60252035, (Stanley Denki K.K.), Dec. 12, 1985.
Wüthrich, A. et al., "Holography with Guided Optical Waves," *Appl. Phys.*, 21, 55–64, (1980).
Collier, R. et al., *Optical Holography*, New York: Academic Press, 1971, (QC449.C6), Sec. 17.6, "Multicolor Images from Volume Holograms," pp. 514–522.
Sincerbox, G., "Formation of Optical Elements by Holography," *IBM Tech. Disc. Bull.*, vol. 10, No. 3, Aug., 1967, pp. 267–268.

*Primary Examiner*—Bruce Y. Arnold
*Assistant Examiner*—David J. Edmondson
*Attorney, Agent, or Firm*—Leonard A. Alkov; Wanda Denson-Low

[57] ABSTRACT

An improved holographic rear window stoplight is provided and includes a hologram member laminated to the rear window surface. Single or multiple hologram layers may be provided. The hologram layers can have a diffraction grating developed in a position relative to the other diffraction grating to provide a folded reflection of light from a source of light of an appropriate wavelength band to indicate a stoplight from a predetermined angle. Alternatively predetermined indicia can be selectively displayed in either a single or multiple layer configuration. The reflection hologram member is transparent when not in use to all observers and remains transparent to the driver even when in use, and thereby prevents any blocking of his field of view.

27 Claims, 3 Drawing Sheets

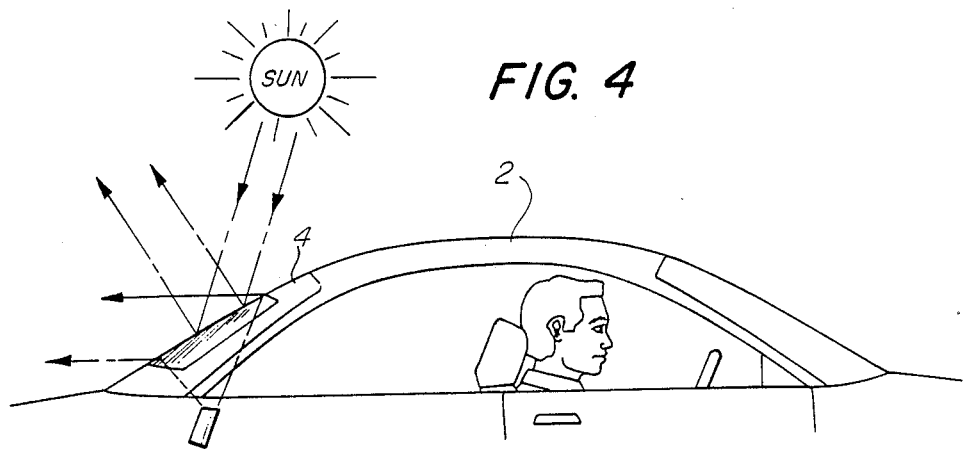
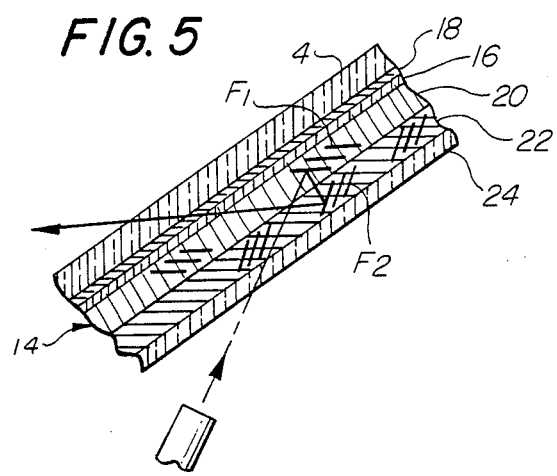
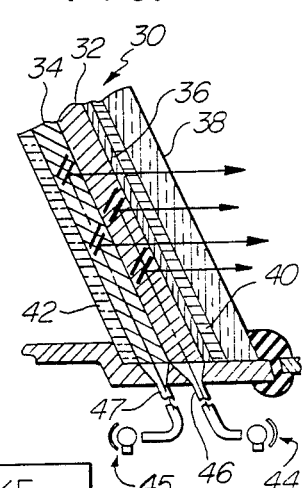
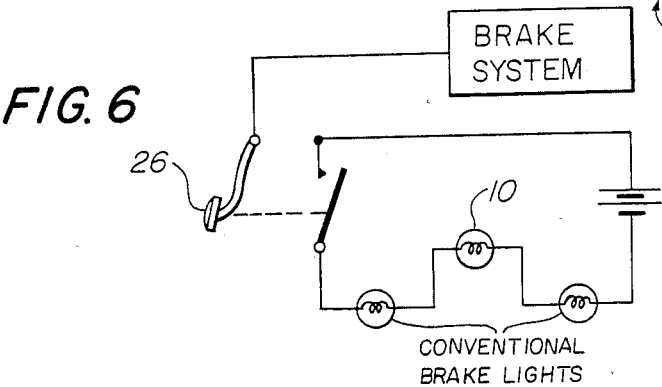

4,892,369

HOLOGRAPHIC REAR WINDOW STOPLIGHT

BACKGROUND OF THE INVENTION

1. Field of the Invention

The present invention relates to a high mounted or rear window stoplight that is mounted within the line of sight of the driver of the vehicle when he views the rear of the vehicle through the rearview mirror and, more particularly, to a substantially transparent holographic rear window stoplight that can be mounted on the rear window of a vehicle without obscuring the vision of the driver.

2. Description of Related Art

Currently, United States automobiles must be provided with a high mounted, centered brake light or stoplight to maximize the visibility of an indicator to drivers following the subject vehicle. Usually, these stoplights are now mounted above or below an optimum position and provide a partial obscuring of the line of sight or viewing angle of the driver through his rearview window. The optimum position being ideally located at the driver's eye level for maximum visibility. Such a location, however, obscures the rear viewing angle of the driver of the vehicle. The configuration and position of the mounting of these high mounted, centered brake lights also detract from the aesthetic design characteristics of the vehicle.

While the use of hologram images having a plurality of diffraction gratings is generally known in the prior art such as disclosed in U.S. Pat. Nos. 3,940,204, 4,447,128 and 4,487,472, there is still a demand in the prior art to provide a new and improved rear stoplight assembly for vehicles.

SUMMARY OF THE INVENTION

An improved rear stoplight assembly capable of being mounted within the field of view of the rearview window of a vehicle without obscuring the vision of a driver is provided. A transmission hologram member capable of being positioned adjacent the rear window, such as being laminated onto the surface of the rear window, can be illuminated by a light projected at an appropriate angle and in an appropriate wavelength band characteristic of a stoplight color, onto the hologram member. The light source, for example, can be mounted on the rear deck below the rear window and out of the line of sight of the driver to prevent any obscuring of the vision of the driver.

In one embodiment, the hologram member supports a holographic image with a characteristic of responding to a predetermined relative angle of impact of the source of light to reflect that light to the rear of the vehicle about a substantially horizontal plane parallel to the vehicle support surface. The hologram member itself is substantially transparent to the driver and permits him to view objects to the rear of the car without obscuring his vision even when activated to provide a stoplight effect. The hologram member, however, is capable of providing a stoplight effect when illuminate at a predetermined angle relative to the source of light. Preferably, the reflection hologram member comprises a transparent flexible substrate that can be laminated by an optical cement to the rear surface of the rear window. A double film layer of a recording material, such as a dichromated gelatin or a poly-N-vinyl carbazole film, is bonded to the substrate for providing a pair of diffraction gratings or fringes to provide a folded optical path for the transmission of the stoplight light through the hologram. By folding the optical path, exterior light is prevented from being reflected directly forward into the vision of the driver. Thus a substantially transparent stoplight is provided within the viewing angle of the driver to provide a centered stoplight effect without any distraction to the actual driver.

In another embodiment, the hologram member can be constructed so that the reference beam enters through the edge of the hologram member. Thus, edge illumination will provide the stoplight effect and internal reflection towards the driver by ambient lighting will be avoided.

The hologram member can be multiple layered with each layer carrying a predetermined diffraction grating or it can be of a single layer with a complex diffraction grating that can be activated by different wavelengths of light and/or incidence angles to provide, selectively, either a stoplight effect and/or predetermined indicia, such as a caution or emergency warning.

The foregoing and other objects, advantages and features of the present invention will become apparent from the following description taken in conjunction with the accompanying drawings which illustrate a specific embodiment of the invention.

BRIEF DESCRIPTION OF THE DRAWINGS

In the accompanying drawings:

FIG. 4 shows an alternative embodiment with a dual reflection hologram stoplight configuration;

FIG. 5 shows a cross-sectional view of the dual reflection hologram stoplight and rearview window;

FIG. 6 shows a schematic of a brakelight circuit;

FIG. 7 shows a double layer edge lit hologram stoplight;

In the following description, like parts are designated by like reference numbers through the several drawings.

DESCRIPTION OF THE PREFERRED EMBODIMENTS

The following description is provided to enable any person skilled in the optical and automotive fields to make and use the invention, and sets forth the best modes contemplated by the inventor of carrying out his invention. Various modifications, however, will remain readily apparent to those skilled in the art since the generic principles of the present invention have been defined herein specifically to provide a relatively economical and easily manufactured hologram rear window stoplight assembly.

Figure 1:
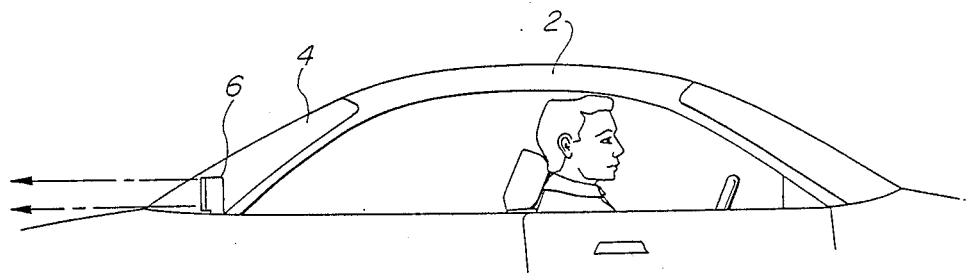
FIG. 1 shows the schematic of a conventional stoplight arrangement on a vehicle that obscures a portion of the view of the driver through his rearview mirror.

Referring to FIG. 1, a vehicle 2 has a conventional rear window 4 mounted within an aperture in the vehicle body for the rear window. A high mounted, central stoplight assembly 6 is mounted on the rear deck at a position below the driver's eye level but still blocking a portion of the rearview window of the driver. As can be appreciated, the awkward structure of the conventional high mounted brake light is relatively unaesthetic to an observer's eyes. Additionally, the stoplight is relatively small and not positioned at the eye level of the following drivers. Other variations of this conventional rear light have been utilized in different manufacturer's vehicles.

Figure 2:
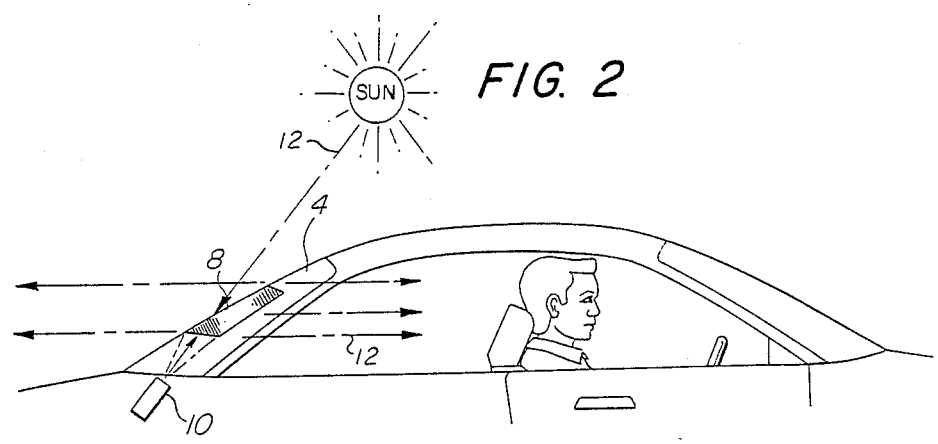
FIG. 2 discloses a single layer transmission hologram stoplight.

To resolve these problems, a unique transmission hologram 8 is proposed in FIG. 2 in combination with a hidden light source capable of projecting light at a specific angle for interfacing with the transmission hologram and subsequent diffraction to the rear of the vehicle. The transmission hologram 8 can comprise a flexible transparent substrate surface, such as mylar, that can be laminated onto the interior surface of the rear window 6. The actual holographic layer can be about 30 microns in thickness. An illumination light source 10 can be mounted in the trunk of the vehicle or at least in a low position on the rear window deck so that it is out of the line of sight or at least out of the viewing angle of the driver. The light source 10 could be connected in series with the brakelight circuit of FIG. 6 to be activated by the brake foot pedal 26 of the vehicle.

Figure 3:
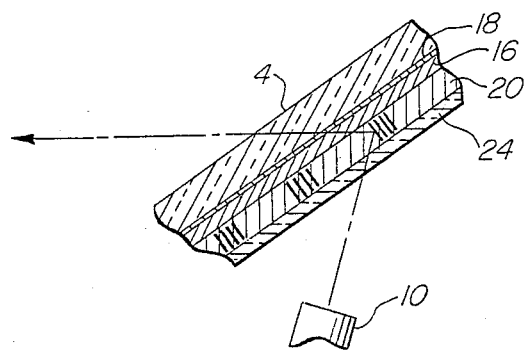
FIG. 3 discloses a cross-sectional view of a portion of FIG. 2.

The hologram 8 includes a laminated film 20 that has been developed with a holographic image having a characteristic of directing light of a particular wavelength range and angular incidence to the rear of the vehicle as shown in FIG. 2 and FIG. 3. For example, the holographic image can be responsive to an angle of 60° to 120° to direct the light substantially rearward. Diffraction gratings having recorded holographic fringes can be developed in the film 8 for providing a direction of light from the light source 10 to extend approximately parallel in a horizontal plane from the rear window surface of the vehicle. In this regard, the particular angular visibility requirement of a high mounted stoplight, e.g., the field angle of view about a central optical axis (plus or minus 45°), can be determined during the construction of the holographic image. The scale of FIG. 3 is exaggerated for illustrative purposes of the present invention.

The holographic procedures for forming the hologram of the present invention can be found in known reference works, such as "Optical Holography" by Collier et al., Academic Press, New York, N.Y. (1971). Additionally, the holographic image can be developed to be particularly sensitive to only a predetermined bandwidth of the illumination source. As is well known in the holographic field, the hologram can be made to operate over a broader wavelength band giving increased brightness for a broadband source, but trading off increased coloration provides a lower phototopic see-through capability.

As can be appreciated, predetermined indicia images can also be shown in the holographic image, for example, flashing messages in emergency situations can be included that can be activated by light of a different wavelength and/or incidence of impact with the hologram 8. While the advantages of the present invention in providing a relatively transparent transmission hologram 8 centered in the rear window 6 of a vehicle for projecting the stoplight or brake light rearward from the illumination source 10 is achieved in the embodiment of FIG. 2, a potential problem can exist in that exterior light such as sun rays 12 can, at certain angles, be diffracted into the vehicle to create a glare in the angle of view of the driver. Certain rearview windows particularly in sports car models are provided with sun shutters, blinds or shields that could prevent this from occurring.

However, to provide a more universal hologram rearview stoplight, an embodiment of two separate holograms shown in FIG. 4 is preferred to resolve this problem of exterior light being diffracted into the vehicle. As with the first embodiment, a substrate of a substantially transparent flexible configuration can be laminated onto the interior surface of the rearview window with the optical cement 18. Actually, the hologram can be laminated onto the exterior surface of the window 4 and still be operable, but this would expose it to the weather. Referring to FIG. 5, a cross-sectional view of the window 4 and dual reflection hologram 14 is disclosed. The substrate 16 is adhered to the surface of the rear window 4 by a layer of optical cement 18. A first hologram film layer 20 is deposited on the substrate 16 and a second hologram film layer 22 can be subsequently deposited on top of the first hologram film layer 20. The hologram film layers 20 and 22 can be formed of conventional film coatings, such as poly-N-vinyl carbazole or a dichromated gelatin, such as disclosed in known reference books, e.g., "Dichromated Gelatin For The Fabrication Of Holographic Optic Elements" by Change et al., Applied Optics, Vol. 18, pgs. 2407-17 (1979). Finally, an abrasion resistant and moisture protection layer is deposited on the second hologram film layer 22, such as a film silicon dioxide or a silicon nitride. A series of parallel fringes are formed as a diffraction grating F1 in the first hologram layer 20, and a second series of parallel fringes are developed as a second diffraction grating F2 at a predetermined angle to the first diffraction gratings in the second hologram layer 22. As can be seen by the schematic illustration of light coming from the light source in FIG. 5, the effect is to provide a folded optical path (similar to a roof prism effect) to the desired brake light so that it is transmitted on the desired optical axis to the rear of the vehicle. The practical effect of this double reflection off of the gratings is to eliminate the possibility of overhead light reflection from the sun entering the car as can be seen in FIG. 4. Thus, this multiple layer hologram configuration not only can replace the current high mounted brake light required in all new United States automobiles but it also prevents outside light from being reflected back into the car, as would be the case with the simple single hologram approach of the first embodiment. Additionally, since the hologram is essentially transparent to the driver, particularly with a narrow bandwidth transmission capability, it can be mounted in a central optimum position at the eye level of the driver on the rear window for maximum visibility to the rear vehicles. FIG. 7 discloses a composite hologram that can serve both as a stoplight and as providing a warning message, such as an emergency or caution signal. The hologram member 30 includes double holographic layers 32 and 34 that are mounted on a flexible transparent substrate 36. The substrate 36 can be glued to the interior surface of a rear window 38 by a layer of optical cement 40. An abrasive resistant protection layer 42 can be provided on the interior surface of layer 34. A series of parallel fringes are formed as a diffraction grating in the first holographic layer 32 to direct a reference light source 44 that is coupled, e.g., through a fiber optic coupling 46 directly to the lower edge of the layer 32. Thus, the first holographic layer 32 can direct red light from the light source 44 to the rear of the vehicle to serve as a stoplight.

The second holographic layer 34 can be constructed to contain an image and or indicia in the form of a diffraction grating such as a caution or warning indicator. Again, an appropriate light source 45 can be coupled to the lower edge of the layer 34 through a fiber optic coupling 47 to reconstruct the image.

In another embodiment of the invention, the holographic layers 32 and 34 can be selectively activated independent of each other with external illumination sources, such as 10 of FIG. 3, that differ in either wavelength or incident angle.

As can be appreciated, it is within the ordinary skill of this art to provide two or more separate diffraction gratings in the same common holographic layer that can be independently activated by different wavelengths. Thus, the embodiment of FIG. 7 can be accomplished equivalently with a single holographic layer if selectivity is based on wavelength or incident angle difference. Finally, if images or messages are contained within a holographic layer then the physical envelope of the windshield should be taken into consideration during the construction of the hologram to compensate for any distortion, for example, the object source can be distorted to compensate for the effect of the window curvature, or the holographic layer can be physically defined in the same position that it will be mounted on the window to permit the development of the diffraction gratings to take into account the non-planar configuration.

Figure 8:
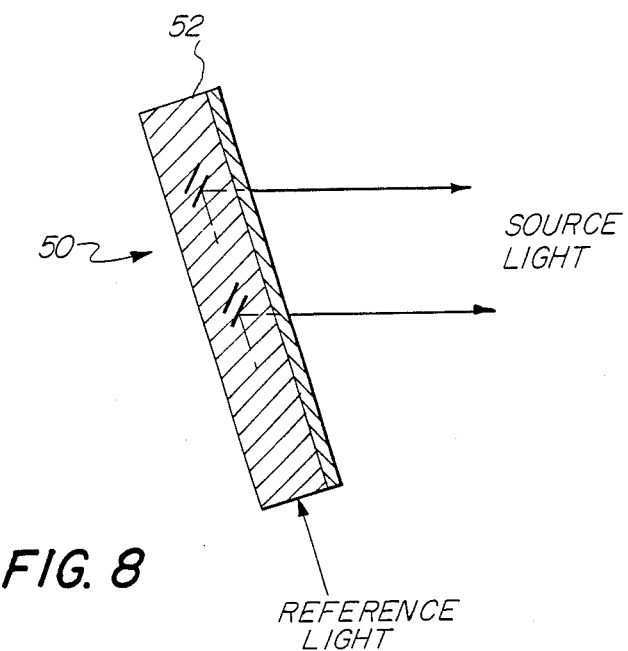
FIG. 8 shows a basic method of constructing the edge lit hologram of FIG. 7.

FIG. 8 discloses a construction of a single layer hologram 50 wherein a source light or object image is directed at a holographic layer 52. A Reference Light is directed along the length of the holographic layer in a fashion analogous to a wave guide. The interference pattern of the Source Light and the Reference Light is developed as the diffraction grating in the holographic layer.

Figure 9:
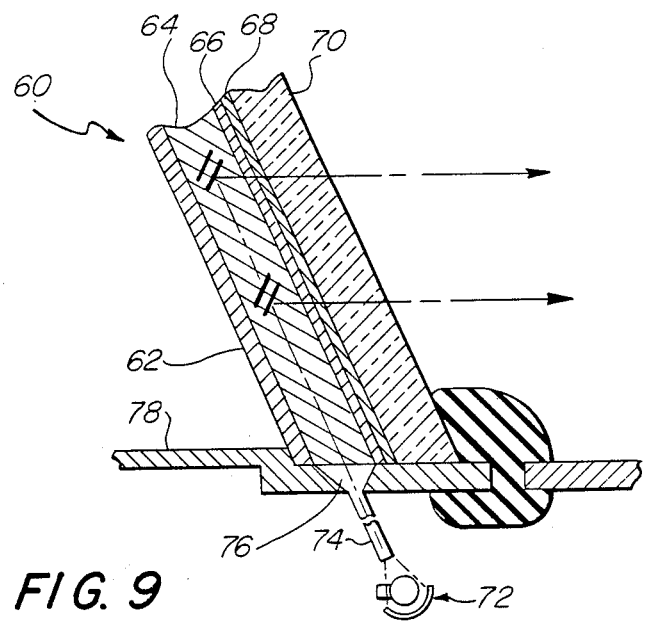
FIG. 9 shows a single holographic layer edge lit hologram.

FIG. 9 represents a practical application of the embodiment of FIG. 8 mounted in a rear deck 78 adjacent the rear window. Such a mounting is of particular advantage in realizing an avoidance of internal light reflection towards the driver and in saving space since a fiber optic link can accommodate a remote light linkage with the hologram 60. The hologram 60 includes the antiabrasive coating 62, the holographic layer 64 and the transparent substrate 66 that is attached by optical cement 68 to the interior of the rear window 70. The light source 72 transmits a replication of the Reference Light through a fiber optic link 74 to a optical coupler 76 that insures a proper light distribution into the edge of the holographic layer 64.

As a result, a red light is appropriately transmitted to the rear while the driver still has full vision through the rear window including through the holographic layer 64.

These hologram members can be relatively inexpensive in mass production with substantially little weight addition to the vehicle. They also do not occupy any substantial space in the interior of the vehicle. Finally, they do not mar the aesthetic design of the vehicle thereby permitting the vehicle designers to provide an ideal compliance with the federal regulations on high mounted brake lights while rendering the brake light relatively invisible when not in use to both the exterior observer and, even when in use, invisible to the driver inside the vehicle. As can be appreciated, the present invention can be provided as either a retrofit kit to modify an existing vehicle or provided as a manufactured improved rear window.

Various modifications to the above described invention may be readily apparent to those skilled in the optical and automotive fields in view of the above described generic concepts. Therefore, the scope of the present invention should be interpreted solely from the following claims.

What is claimed is:

1. An improved rear stoplight assembly capable of being mounted in the field of view of the rear view window of a vehicle without obscuring the vision of the driver, comprising:
   a hologram member capable of being positioned adjacent the rear window;
   a source of light of an appropriate wavelength band, characteristic of a stoplight color, capable of being directed to the hologram member and positioned to prevent any obscuring of the vision of the driver, the hologram member having a holographic image with a characteristic of responding to the relative angle of impact of the source of light to direct that light to the rear of the vehicle whereby the hologram member is substantially transparent to the driver while providing a stoplight light effect when illuminated by the source of light, wherein said source of light provides projected directional light and the hologram member is capable of reflecting the light in a range of approximately 60° to 120° to a position substantially horizontal to the support surface of the vehicle;
   means for activating the source of light; and
   a second reflection holographic image on said hologram member, each holographic image having a series of parallel finges, the respective orientation of the fringes of the first image directing the light from said light source to the second image and then rearward at a position approximately parallel to the support surface of the vehicle whereby exterior incident light will not be reflected forward through the hologram member in to the line of sight of the driver as he looks through his rearview mirror.

2. The invention of claim 1 further including a protective exterior coating on the hologram member to provide abrasion resistance.

3. The invention of claim 1 wherein the hologram member includes a tansparent flexible substrate suitable for lamination to a rear window surface and at least a double layer laminated film bonded to the substrate for providing the hologram member.

4. The invention of claim 1 wherein the source of light is coupled to an edge of the hologram member.

5. The invention of claim 1 wherein the source of light is displaced from the hologram member and a fiber optic link couples the light to an edge of the hologram member.

6. The invention of claim 1 further including a support member for contacting the rearview window wherein the hologram member is mounted on the rearview window, the hologram member extending into the support member and coupling with the source of light adjacent an edge of the hologram member.

7. The invention of claim 1 further including a second holographic image on the hologram member that can be activated to provide indicia, such as a caution.

8. The invention of claim 1 wherein the hologram member has a pair of holographic layers.

9. The invention of claim 1 further including means for providing a visual indicator to the rear of the vehicle other than a stoplight effect.

10. In a vehicle having a rear window that is required to have a stoplight mounted above a certain rear portion of the vehicle and capable of being positioned within the space defining the line of sight of the driver through his rear view mirror, the improvement comprising:
- a hologram member having a holographic image mounted on the rear window;
- a source of light, of an appropriate wavelength band to indicate a stoplight, directed at the hologram, the holographic image having a characteristic to respond to the relative angle of impact of the source of light and to direct the light to the rear of the vehicle while permitting other light impacting the hologram from another direction within the angle of view of the rearview mirror to pass to the driver whereby the hologram member is substantially transparent to the driver while providing a stoplight light from the source of light when activated; and
- means for activating the light source upon braking of the vehicle wherein the source of light is mounted with the rear deck of the vehicle; and
- a second reflection holographic image on the hologram member, each holographic image having a series of parallel fringes, the respective orientation of the fringes of the first image is capable of directing the light from the light source to the second image and then rearward at a position approximately parallel to the support surface of the vehicle whereby exterior incident light will not be reflected forward through the hologram member into the line of sight of the driver as he looks through his rearview mirror.

11. The invention of claim 10 further including a protective exterior coating on the hologram member to provide abrasion resistance.

12. The invention of claim 10 wherein the hologram member includes a transparent flexible substrate suitable for lamination to a rear window surface and at least a double holographic layer laminated film bonded to the substrate for providing the hologram member.

13. The invention of claim 10 wherein the source of light is coupled to an edge of the hologram and the light travels through the hologram before being directed out of the hologram by the holographic image.

14. An improved rear window for a vehicle comprising:
- a transparent rear window substrate of a configuration for mounting within the rear window aperture of a vehicle having a hologram member laminated to a surface of the substrate, the hologram member having an image configuration to direct a bandwidth of light, characteristic of the color of a stoplight, to the rear of the vehicle when impacted with that light at a predetermined angle, whereby the hologram member is substantially transparent when viewed from the position of the driver of the vehicle, such position of the driver being at other than the predetermined angle, that will reflect stoplight coloration to provide a stoplight effect; and
- a second holographic image on the hologram member, each holographic image having a series of parallel fringes, the respective orientation of the fringes of the first image directing the light from the light source to the second image and then rearward at a position approximately parallel to the support surface of the vehicle whereby exterior incident light will not be reflected forward through the hologram member into the line of sight of the driver as he looks through his rearview mirror.

15. The invention of claim 14 further including means for coupling the light into an edge of the hologram so that it travels through the hologram in one direction before being directed out of the hologram in a second direction by the holographic image.

16. The invention of claim 15 wherein the hologram member includes a transparent flexible substrate suitable for lamination to a rear window surface and at least a double layer laminated film bonded to the substrate for providing the hologram member.

17. The invention of claim 14 further including a protective exterior coating on the hologram member to provide abrasion resistance.

18. An improved rear stoplight assembly capable of being mounted within the field of view of the rearview window of a vehicle without obscuring the vision of the driver, comprising:
- means for providing a stoplight within the rearview window including a substantially transparent and colorless stoplight member mounted adjacent the rear window and within the rearview vision of the driver;
- means for activating the stoplight member to produce a light directed to the rear of the vehicle of a characteristic wavelength band for a stoplight that is substantially visible only to an observer behind the vehicle and not to the driver, the driver's field of view extending through the stoplight member regardless of its activation; and
- a holographic image of said substantially transparent and colorless stoplight member and a reflection holographic image on said means for providing a stoplight member both having a series of parallel fringes, the respective orientation of the fringes of the image of said stoplight member directing the light from the means for activating the stoplight member to produce a light to said reflection holographic image and then rearward at a position approximately parallel to said rearview window of the vehicle whereby exterior incident light will not be reflected forward through said stoplight member into the line of sight of the driver as he looks through his rearview mirror.

19. The invention of claim 18 wherein the transparent stoplight member includes a hologram member with diffraction gratings developed in a holographic layer.

20. The invention of claim 19 wherein the means for activating the stoplight member includes a source of light of an appropriate wavelength band and incidence of impact on the hologram diffraction gratings.

21. The invention of claim 20 wherein the source of light is positioned to direct light along the length of the holographic layer before contacting the diffraction gratings for subsequent direction of the light out of the hologram member.

22. A combined rear stoplight display assembly and illuminated sign member capable of being mounted within the field of view of the rearview window of a vehicle without obscuring the vision of the driver, comprising:
- means for providing a stoplight within the rearview window including a substantially transparent display member mounted adjacent the rear window and within the rearview vision of the driver;

means for activating the display member to produce a light directed to the rear of the vehicle of a characteristic wavelength band for a stoplight, that is substantially visible only to an observer behind the vehicle and not to the driver;

reflection holographic image on said means for providing a stoplight, a holographic image of said substantially transparent display member and a reflection holographic image on said means for protecting a stoplight member both having a series of parallel fringes, the respective orientation of the fringes of the image of said display member directing the light from the means for activating the display member to produce a light to said reflection holographic image and then rearward at a position approximately parallel to said rearview window of the vehicle whereby exterior incident light will not be reflected forward through said stoplight member into the line of sight of the driver as he looks through his rearview mirror; and means for activating the generation of predetermined indicia on the display member, that is substantially visible only to an observer behind the vehicle, the driver's field of view extending through the display member regardless of its activation as either a stoplight or for displaying indicia.

23. The invention of claim 22 wherein the transparent display member includes a hologram member with diffraction gratings developed in a holographic layer.

24. The invention of claim 23 wherein the means for activating the display member includes a source of light of an appropriate wavelength band and incidence of impact on the hologram diffraction gratings.

25. The invention of claim 24 wherein the source of light is positioned to direct light along the length of the holographic layer before contacting the diffraction gratings for subsequent direction of the light out of the hologram member.

26. The invention of claim 24 wherein the diffraction gratings for the predetermined indicia have been constructed to compensate for the curvature of the rearview window.

27. The invention of claim 24 wherein the diffraction gratings are activated by a first light of a predetermined wavelength band to provide a stoplight effect and a second light of a different predetermined wavelength band to display the predetermined indicia.

* * * * *